(12) United States Patent
Im et al.

(10) Patent No.: US 10,174,801 B2
(45) Date of Patent: Jan. 8, 2019

(54) METHOD FOR MANUFACTURING VEHICLE BRAKE DISC

(71) Applicant: DACC CARBON CO., LTD., Jeonju-si, Jeollabuk-do (KR)

(72) Inventors: Dong Won Im, Gimhae-si (KR); Yeon Ho Choi, Jeonju-si (KR); Kang Yoo, Jeonju-si (KR); Nam Cheol Lee, Jeonju-si (KR)

(73) Assignee: DACC CARBON CO., LTD., Jeongju-si, Jeollabuk-do (KR)

( * ) Notice: Subject to any disclaimer, the term of this patent is extended or adjusted under 35 U.S.C. 154(b) by 338 days.

(21) Appl. No.: 14/961,412

(22) Filed: Dec. 7, 2015

(65) Prior Publication Data
US 2016/0169311 A1 Jun. 16, 2016

(30) Foreign Application Priority Data

Dec. 16, 2014 (KR) .......................... 10-2014-0180872
Feb. 10, 2015 (KR) .......................... 10-2015-0020470

(51) Int. Cl.
*F16D 69/02* (2006.01)
*B32B 18/00* (2006.01)
(Continued)

(52) U.S. Cl.
CPC ............ *F16D 69/028* (2013.01); *B32B 18/00* (2013.01); *C04B 35/573* (2013.01); *C04B 35/83* (2013.01);
(Continued)

(58) Field of Classification Search
CPC ............................. F16D 69/028; B32B 18/00
(Continued)

(56) References Cited

U.S. PATENT DOCUMENTS

| 924 A | * | 9/1838 | Sorel | ...................... C23C 10/28 |
| | | | | 116/76 |
| 3,791,493 A | * | 2/1974 | Yamaguchi | ........... F16D 69/025 |
| | | | | 188/251 M |

(Continued)

FOREIGN PATENT DOCUMENTS

| GB | 632247 A | * 11/1949 | ........... C04B 35/573 |
| JP | 2004035307 A | 2/2004 | |

(Continued)

OTHER PUBLICATIONS

European Search Report dated May 10, 2016, issued in corresponding European Patent Application No. 15199753.3-1371.

(Continued)

*Primary Examiner* — Jacob T Minskey
*Assistant Examiner* — Russell E Sparks
(74) *Attorney, Agent, or Firm* — Hauptman Ham, LLP

(57) ABSTRACT

A brake disc manufactured by a method of manufacturing a brake disc according to the present invention includes a carbon fiber Cf, silicon Si, silicon carbide Sic, and a silicon-copper alloy $Si_xCu_y$. The carbon fiber Cf, silicon Si, carbon C, and silicon carbide SiC make a disc light and provide high thermal shock resistance, anti-oxidation, wear resistance, strength, and friction coefficient. The copper Cu and silicon-copper alloy $Si_xCu_y$ increase heat capacity at constant volume of a disc, so a large increase in temperature of the disc is prevented and a changing range of the friction coefficient is reduced in braking. Accordingly, the brake disc according to the present invention has all of the advantage of a brake disc made of a carbon fiber-reinforced ceramic composites without thermal deformation and deterioration of a pad, a hat part, and a caliper.

2 Claims, 13 Drawing Sheets

(51) Int. Cl.
  *C04B 35/573* (2006.01)
  *C04B 35/83* (2006.01)
  *C04B 37/00* (2006.01)
  *F16D 65/12* (2006.01)

(52) U.S. Cl.
  CPC .......... *C04B 37/008* (2013.01); *F16D 65/126* (2013.01); *F16D 69/023* (2013.01); *C04B 2235/407* (2013.01); *C04B 2235/428* (2013.01); *C04B 2235/526* (2013.01); *C04B 2235/5272* (2013.01); *C04B 2235/612* (2013.01); *C04B 2235/616* (2013.01); *C04B 2235/80* (2013.01); *C04B 2237/365* (2013.01); *C04B 2237/38* (2013.01); *C04B 2237/385* (2013.01); *C04B 2237/584* (2013.01); *C04B 2237/61* (2013.01); *F16D 2200/0004* (2013.01); *F16D 2200/0047* (2013.01); *F16D 2200/0052* (2013.01)

(58) Field of Classification Search
  USPC ........................................................ 264/29.1
  See application file for complete search history.

(56) References Cited

U.S. PATENT DOCUMENTS

| | | | | |
|---|---|---|---|---|
| 4,222,430 A | * | 9/1980 | Lindner | ................ C23C 24/10 164/112 |
| 2011/0311753 A1 | * | 12/2011 | Faria | ...................... C04B 35/52 428/66.2 |
| 2013/0248305 A1 | * | 9/2013 | Choi | ...................... F16D 65/12 188/218 XL |

FOREIGN PATENT DOCUMENTS

| | | |
|---|---|---|
| KR | 20120057879 A | 6/2012 |
| WO | 0018702 A1 | 4/2000 |
| WO | 2012074260 A2 | 6/2012 |
| WO | 2013171770 A1 | 11/2013 |

OTHER PUBLICATIONS

Japanese Office Action dated Jan. 17, 2017, issued in corresponding Japanese Patent Application No. 2015-243751.

* cited by examiner

VEHICLE BRAKE DISC INCLUDING SI + CU

METHOD FOR MANUFACTURING VEHICLE BRAKE DISC

CROSS-REFERENCE TO RELATED APPLICATIONS

This application claims the priority of Korean Patent Application No. 10-2014-0180872 filed on Dec. 16, 2014, and the priority of Korean Patent Application No. 10-2015-0020470 filed on Feb. 10, 2015 in the Korean Intellectual Property Office, the disclosure of which is incorporated herein by reference.

BACKGROUND OF THE INVENTION

Field of the Invention

The present invention relates to a method for manufacturing a brake disc.

Description of the Related Art

Brake discs are classified into a drum brake type and a disc brake type.

The disc brake type decelerates or stops a vehicle by decelerating or stopping a disc, using friction between a pad and the disc.

Recently, disc types of vehicle brake discs (hereafter, referred to as "brake disc") are made of a carbon fiber-reinforced ceramic composites.

The carbon fiber-reinforced ceramic composites is a material using ceramic as a matrix and reinforced with a carbon fiber. When a brake disc is made of a carbon fiber-reinforced ceramic composite, it is possible to manufacture a brake disc that is light and having high thermal shock resistance, anti-oxidation, wear resistance, strength, and a friction coefficient.

The applicant(s) have several techniques of manufacturing brake discs using carbon fiber-reinforced ceramic composites and manufactures and selling brake discs made of carbon fiber-reinforced ceramic composites, using these techniques.

On the other hand, when that applicant(s) has sold brake discs, customers have frequently claimed that although there is no problem with the brake discs themselves, there are problems with a pad that comes in contact with the brake discs, a hat part that connects the brake discs to wheels, and a caliper that brings a pad in close contact with the brake discs.

The reasons are as follows.

The brake discs made of carbon fiber-reinforced ceramic composites are lower in density than brake discs made of cast iron, so they are smaller in heat capacity at constant volume than the brake discs made of cast iron. Accordingly, the temperature of the discs increases higher than that of the brake disc made of cast iron due to friction between the pad and the disc in braking. Accordingly, there is no problem with the brake discs that can sufficiently resist high temperature, but pads, hat parts, and calipers around the discs are thermally deformed and deteriorated.

When a pad is thermally deformed and deteriorated, the friction coefficient between a disc and the pad increases in a large range, so uniform braking performance cannot be achieved.

When a hat part is thermally deformed and deteriorated, noise and vibration are generated.

When a caliper is thermally deformed and deteriorated, the caliper cannot accurately bring a pad in close contact with a brake disc, so noise and vibration are generated.

Further, when a caliper is heated, brake oil for operating the caliper is boiled, so braking performance rapidly drops.

In order to solve these problems, by making a brake disc made of a carbon fiber-reinforced ceramic composites larger in size than the brake discs made of cast irons, the volume is increased and it is possible to prevent a rise in temperature of a disc.

However, it cannot be a solution because it is impossible to immediately replace a brake disc made of cast iron with a brake disc made of a carbon fiber-reinforced ceramic composites, unless a vehicle is reconstructed.

SUMMARY OF THE INVENTION

An aspect of the present invention provides a method of manufacturing a brake disc that has all the advantages of a brake disc made of a carbon fiber-reinforced ceramic composites and can solve the defects that a pad, a hat part, and a caliper are thermally deformed and deteriorated and a friction coefficient changes in a large range, even without increasing the size further than a brake disc made of cast iron.

According to an aspect of the present invention, there is provided a method of manufacturing a brake disc that includes: a first step of making a first mixture by mixing a carbon fiber and phenolic resin and making a second mixture by mixing a carbon fiber and phenolic resin; a second step of making a first green body by pressing the first mixture in a mold with a press and making a second green body by pressing the second mixture in the mold with a press; a third step of making a first carbonized body by carbonizing the first green body and making a second carbonized body by carbonizing the second green body; a fourth step of machining the first carbonized body and the second carbonized body; a fifth step of bonding the machined first carbonized body and second carbonized body to each other; a sixth step of putting mixture powder made by mixing silicon powder and copper powder over and under the bonded first and second carbonized bodies; a seventh step of making a carbon fiber-reinforced ceramic composites by melting and infiltrating the mixture powder into the bonded first and second carbonized bodies; and an eighth step of grinding the carbon fiber-reinforced ceramic composites.

Further, according to another aspect of the present invention, there is provided a method of manufacturing a brake disc that includes: a first step of making a first mixture by mixing a carbon fiber and phenolic resin and making a second mixture by mixing a carbon fiber and phenolic resin; a second step of making a first green body by pressing the first mixture in a mold with a press and making a second green body by pressing the second mixture in the mold with a press; a third step of making a first carbonized body by carbonizing the first green body and making a second carbonized body by carbonizing the second green body; a fourth step of machining the first carbonized body and the second carbonized body; a fifth step of bonding the machined first carbonized body and second carbonized body to each other; a sixth step of putting mixture powder made by mixing silicon powder and copper powder at a ratio of 6 to 4 wt % over and under the bonded first and second carbonized bodies such that the mixture powder is accumulated much over than under the bonded first and second carbonized bodies, and putting a weight on the mixture powder over the bonded first and second carbonized bodies; a seventh step of making a carbon fiber-reinforced ceramic composites by melting and infiltrating the mixture powder into the bonded first and second carbonized bodies; and an eighth step of grinding the carbon fiber-reinforced ceramic composites.

Further, according to another aspect of the present invention, there is provided a method of manufacturing a brake disc that includes: a first step of putting a first mixture in which a carbon fiber, phenolic resin, and copper powder are mixed into a mold at a first height to make a first friction layer including copper; a second step of putting a second mixture in which a carbon fiber, phenolic resin, and copper powder are mixed into the mold at a second height over the first mixture to make a support layer including copper; a third step of putting a third mixture in which a carbon fiber, phenolic resin, and copper powder are mixed into the mold at a third height over the second mixture to make a second friction layer including copper; a fourth step of forming a green body by pressing the sequentially stacked first mixture, second mixture, and third mixture in the mold with a press at a time; a fifth step of making a carbonized body by carbonizing the green body; a sixth step of machining the carbonized body; a seventh step of making a carbon fiber-reinforced ceramic composites by melting and infiltrating silicon powder into the machined carbonized body; and an eighth step of grinding the carbon fiber-reinforced ceramic composites.

According to another aspect of the present invention, there is provided a method of manufacturing brake disc that includes: a first step of making a first mixture by mixing a carbon fiber having a length of 150 to 200 μm, phenolic resin, and copper powder having a grain size of tens of micrometers, and of putting the first mixture into a mold at a first height of 1 to 2 mm, to make a first friction layer including SiC 64 wt %, Si 6 wt %, C 10 wt %, and Cu 20 wt %; a second step of making a second mixture by mixing a carbon fiber having a length less than 30 mm, phenolic resin, and copper powder having a grain size of tens of micrometers, and of putting the second mixture over the first mixture in the mold at a second height of 25 to 50 mm, to make a support layer including SiC 20 wt %, Si 7 wt %, C 53 wt %, and Cu 20 wt %; a third step of making a third mixture by mixing a carbon fiber having a length of 150 to 200 μm, phenolic resin, and copper powder having a grain size of tens of micrometers, and of putting the third mixture over the second mixture in the mold at a third height of 1 to 2 mm, to make a second friction layer including SiC 64 wt %, Si 6 wt %, C 10 wt %, and Cu 20 wt %; a fourth step of making a green body by pressing the first mixture, the second mixture, and the third mixture sequentially stacked in the mold with a press at a time; a fifth step of making a carbonized body by carbonizing the green body; a sixth step of forming a shaft hole through which an axle passes at the center of the carbonized body, forming through-holes through which bolts are inserted to fasten a hat part with regular intervals on the same circle around the shaft hole, forming cooling channels in the side of the carbonized body, and forming perforations through the top and the bottom of the carbonized body to communicate with the cooling channels; a seventh step of making a carbon fiber-reinforced ceramic composites by melting and infiltrating silicon powder into the carbonized body having the shaft hole, the through-holes, the cooling channels, and the perforations; and an eighth step of grinding the carbon fiber-reinforced ceramic composites.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Hereinafter, a method for manufacturing a brake disc according to a first embodiment of the present invention will be described in detail.

Figure 1:
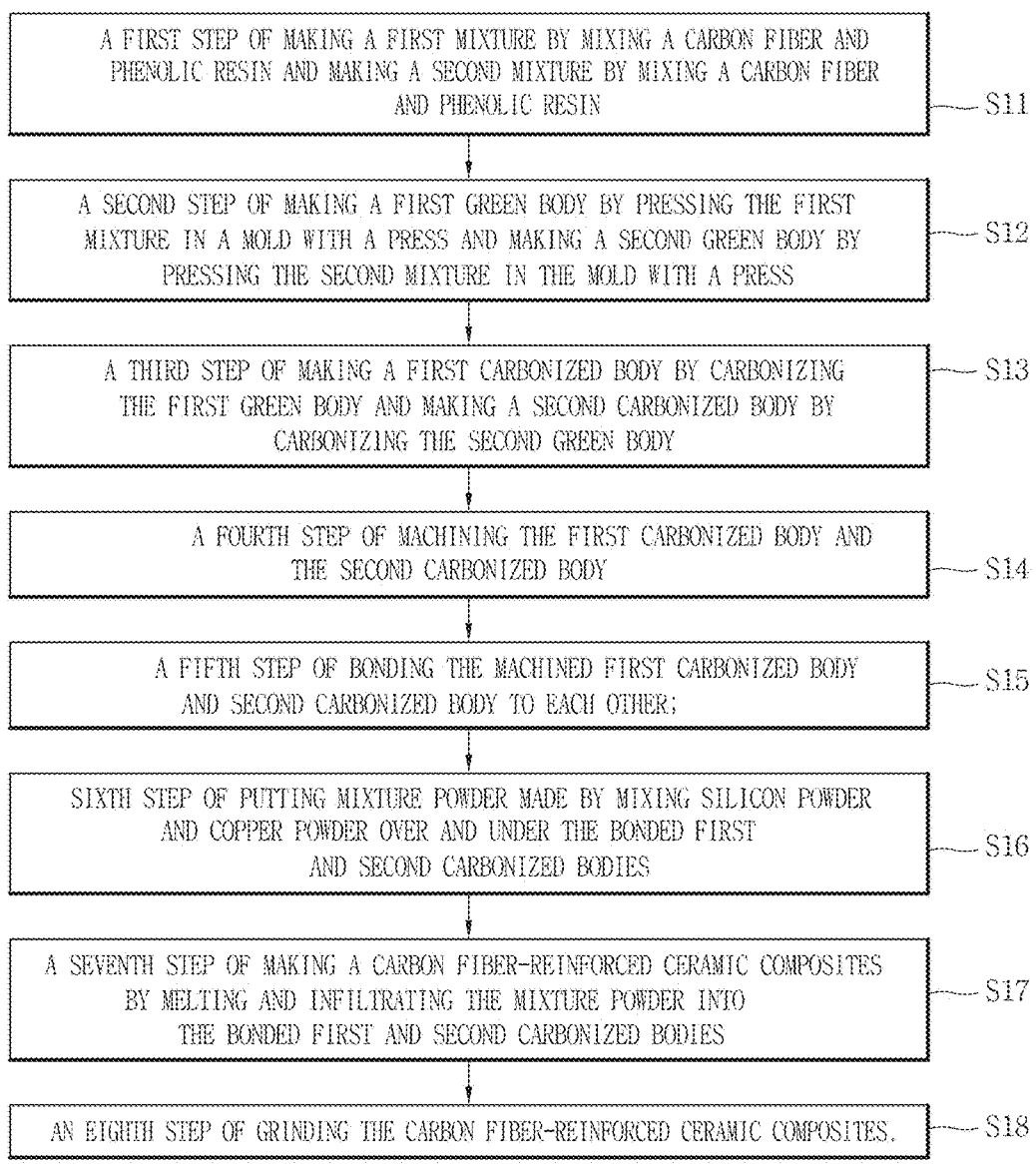
FIG. 1 is a flowchart illustrating a method for manufacturing a brake disc according to a first embodiment of the present invention.

As illustrated in FIG. 1, a method of manufacturing a brake disc according to the first embodiment of the present invention includes: a first step of making a first mixture by mixing a carbon fiber and phenolic resin and making a second mixture by mixing a carbon fiber and phenolic resin (S11); a second step of making a first green body by pressing the first mixture in a mold with a press and making a second green body by pressing the second mixture in the mold with a press (S12); a third step of making a first carbonized body by carbonizing the first green body and making a second carbonized body by carbonizing the second green body (S13); a fourth step of machining the first carbonized body and the second carbonized body (S14); a fifth step of bonding the machined first carbonized body and second carbonized body to each other (S15); a sixth step of putting mixture powder made by mixing silicon powder and copper powder over and under the bonded first and second carbonized bodies (S16); a seventh step of making a carbon fiber-reinforced ceramic composites by melting and infiltrating the mixture powder into the bonded first and second carbonized bodies (S17); and an eighth step of grinding the carbon fiber-reinforced ceramic composites (S18).

Figure 2A:
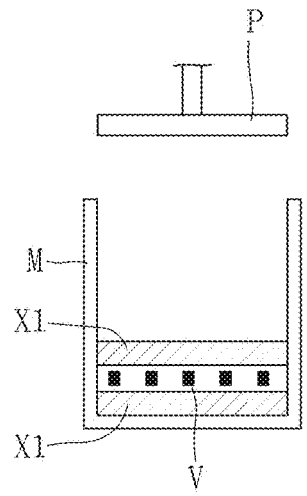
FIG. 2A is a view illustrating a state when a first mixture is in a mold, a core is on the first mixture, and a first mixture on the core in the mold.
Figure 2B:
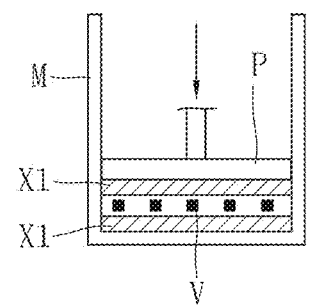
FIG. 2B is a view illustrating a state of making a first green body by pressing a mixture with a press.
Figure 2C:
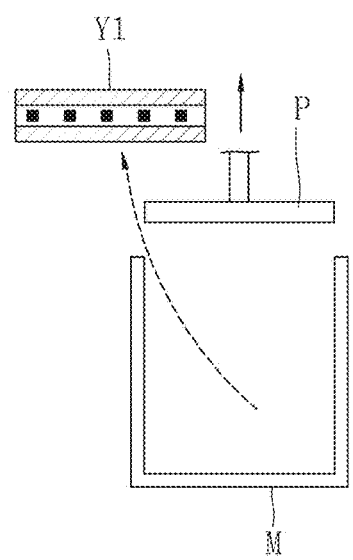
FIG. 2C is a view illustrating a state when the first green body is taken out of the mold.
Figure 3A:
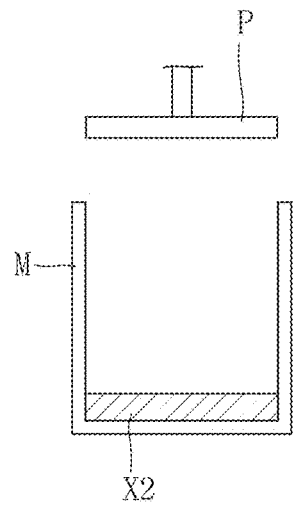
FIG. 3A is a view illustrating a state when a second mixture is in the mold.
Figure 3B:
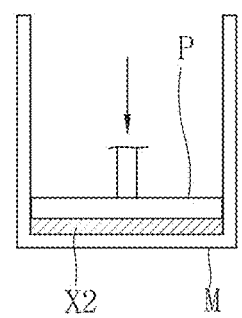
FIG. 3B is a view illustrating a state when the second green body is made by putting a second mixture into a mold and then pressing the second mixture with a press.

Solid arrow lines in FIGS. 2B and 3B indicate the movement direction of a press. The dotted arrow lines in FIGS. 2C and 3C indicate a direction in which the first green body or the second green body is taken out of a mold.

Hereinafter, the first step (S11) is described.

Referring to FIGS. 2A and 3A, a first mixture X1 is made by mixing a carbon fiber of 30 to 70 vol % and phenolic resin of 70 to 30 vol %. The length of the carbon fiber in the first mixture X1 is less than 30 mm. In this embodiment, the length of the carbon fiber is 29 mm. Alternatively, carbon fibers having different lengths, that is, a carbon fiber of 29 mm and a carbon fiber of 6 mm may be mixed. A support layer 110 (see FIG. 7) to be described below is formed by the first mixture X1.

A second mixture X2 is made by mixing a carbon fiber of 30 to 70 vol % and phenolic resin of 70 to 30 vol %. The length of the carbon fiber in the second mixture X2 is 150 to 200 µm. A friction layer 120 (see FIG. 7) to be described below is formed by the second mixture X2.

Hereinafter, the second step (S12) is described.

As illustrated in FIG. 2A, the first mixture X1 is put into a mold M.

A core V is placed on the first mixture X1. The core V has the shape of a cooling channel. Another first mixture X1 is put on the core V.

As illustrated in FIG. 2B, a first green body Y1 is formed by pressing them with a press P. In this case, the pressing pressure is 3 to 5 MPa. Herein, the first mixture X1 may be heated by a heater on the press P. The heating temperature is 120 to 180° C.

As illustrated in FIG. 2C, the first green body Y1 is taken out of the mold M.

The first green body Y1 is composed of carbon fibers randomly distributed in the cured phenolic resin.

As illustrated in FIG. 3A, the second mixture X2 is put into the mold M.

As illustrated in FIG. 3B, a second green body Y2 is formed by pressing the second mixture X2 with the press P. In this case, the pressing pressure is 3 to 5 MPa. Herein, the second mixture X2 may be heated by the heater on the press P. The heating temperature is 120 to 180° C.

Figure 3C:
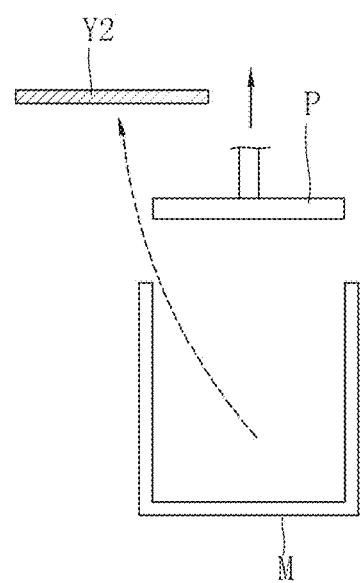
FIG. 3C is a view illustrating a state when the second green body is taken out of the mold.

As illustrated in FIG. 3C, the second green body Y2 is taken out of the mold M.

The second green body Y2 is composed of carbon fibers randomly distributed in the cured phenolic resin.

Hereinafter, the third step (S13) is described.

The first green body Y1 is put into a container (not illustrated). The container (not illustrated) is put into a vacuum resistance heating furnace. A vacuum atmosphere or an inert atmosphere was made in the vacuum resistance heating furnace.

The vacuum resistance heating furnace increases the temperature of the first green body Y1 to 1000° C. for thirteen hours. The vacuum resistance heating furnace maintains the temperature of the first green body Y1 at 1000° C. for one to two hours. While the temperature of the first green body Y1 is increased and maintained at 1000° C., organic compounds in the first green body Y1 are thermally decomposed into carbon. Pores are formed at the portions left after the organic compounds are thermally decomposed. The first green body Y1 is carbonized into a first carbonized body C1.

When the first green body Y1 is carbonized, the core V is thermally decomposed. When the core V is thermally decomposed, cooling channels 111 (see FIG. 4) are formed at the portions left after the core V is thermally decomposed.

The second green body Y2 is put into the container (not illustrated). The container (not illustrated) is put into the vacuum resistance heating furnace. A vacuum atmosphere or an inert atmosphere was made in the vacuum resistance heating furnace.

The vacuum resistance heating furnace increases the temperature of the second green body Y2 to 1000° C. for thirteen hours. The vacuum resistance heating furnace maintains the temperature of the second green body Y2 at 1000° C. for one to two hours. While the temperature of the second green body Y2 is increased and maintained at 1000° C., organic compounds in the second green body Y2 are thermally decomposed into carbon. Pores are formed at the portions left after the organic compounds are thermally decomposed. The second green body Y2 is carbonized into a second carbonized body C2.

Hereinafter, the fourth step (S14) is described.

A shaft hole through which an axle passes is formed at the centers of the first carbonized body C1 and the second carbonized body C2.

Through-holes through which bolts are inserted to fasten a hat part are formed with regular intervals on the same circle around the shaft holes of the first carbonized body C1 and the second carbonized body C2. The hat part is fastened to a wheel.

Hereinafter, the fifth step (S15) is described.

Figure 4:
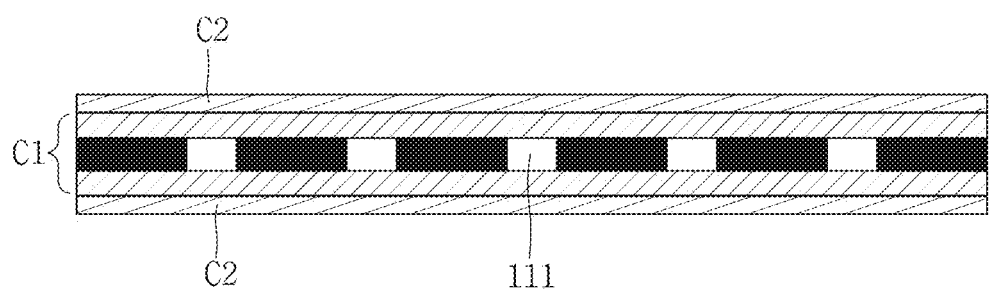
FIG. 4 is a view illustrating a state when a first carbonized body and a second carbonized body are bonded.

Referring to FIG. 4, the first carbonized body C1 and the second carbonized body C2 are bonded by phenolic resin.

Hereinafter, the sixth step (S16) is described.

Figure 5:
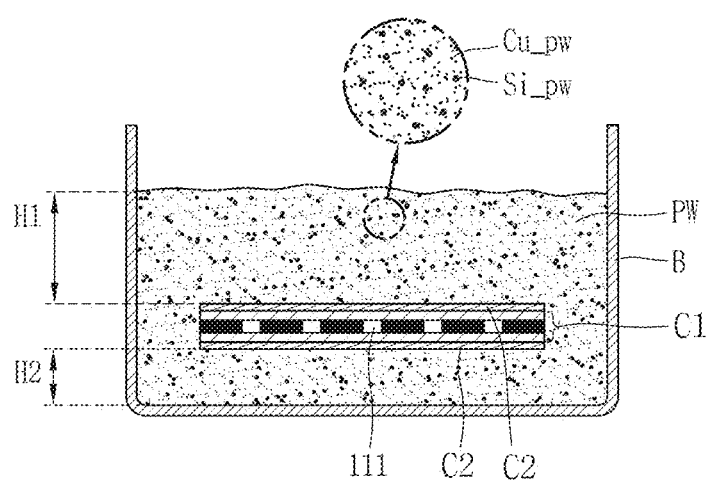
FIG. 5 is a view illustrating a state when mixture powder made by mixing silicon powder with copper powder are put over and under the first carbonized body and the second carbonized body.

Referring to FIG. 5, mixture powder PW is made by mixing silicon powder Si_pw and copper powder Cu_pw. The bonded first carbonized body C1 and second carbonized body C2 are put into a container B. The mixture powder PW is put over and under the bonded first carbonized body C1 and second carbonized body C2.

The grain size of the silicon powder Si_pw is 1 to 2 mm and the grain size of the copper powder Cu_pw is tens of micrometers.

The mixture powder PW is made by mixing the silicon powder Si_pw and the copper powder Cu_pw at a ratio of 6 to 4 wt %. The reasons are as follows.

When the copper powder Cu_pw is smaller than 4, the amount of copper Cu constituting a disc is small, so the effect of increasing density of the disc by copper Cu decreases. When the effect of increasing the density of a disc decreases, it is impossible to prevent a large increase in temperature of the disc in braking, so the problems with the existing discs cannot be solved.

On the contrary, when the copper powder Cu_pw is larger than 4, the copper powder Cu_pw is difficult to be infiltrated into the first carbonized body C1 and the second carbonized body C2. This is because the copper powder Cu_pw cannot be infiltrated into the first carbonized body C1 and the second carbonized body C2 by itself and is infiltrated when the silicon powder Cu_Pw is infiltrated into the first carbonized body C1 and the second carbonized body C2. This is because the wetting angles of copper and carbon are larger than 45°, so the copper powder Cu_pw is rolled in a circle rather than being infiltrated into the first carbonized body C1 and the second carbonized body C2. Accordingly, when the copper powder Cu_pw is too much, the silicon powder Si_pw is difficult to be infiltrated with the copper powder Cu_pw into the first carbonized body C1 and the second carbonized body C2.

Accordingly, when the copper powder Cu_pw is larger than 4, the amount of copper Cu constituting a disc is small and many pores are formed in the disc, so the effect of increasing density of the disc by copper Cu decreases. When the effect of increasing the density of a disc decreases, it is impossible to prevent an increase in temperature of the disc in braking, so the problems with the existing discs cannot be solved.

Accordingly, the ratio of 6 to 4 of the silicon powder Si_pw and the copper powder Cu_pw is a very important value having a critical meaning.

Referring to FIG. 5, it is preferable that the amount of the mixture powder PW over the bonded first carbonized body C1 and second carbonized body C2 is larger than the amount of the mixture powder PW under the bonded first carbonized body C1 and second carbonized body C2. This is because the mixture powder PW over the bonded first carbonized body C1 and second carbonized body C2 can be more easily infiltrated into the first carbonized body C1 and the second carbonized body C2 by the gravity. Accordingly, in order to reduce to time that powder takes to be infiltrated, it is preferable to put a larger amount of mixture powder PW over than under the bonded first carbonized body C1 and second carbonized body C2.

To this end, the height H1 of the mixture powder PW over the bonded first carbonized body C1 and second carbonized body C2 is made larger than the height H2 of the mixture powder PW under the bonded first carbonized body C1 and second carbonized body C2. In this embodiment, the height H1 of the mixture powder PW is double the height H2 of the mixture powder PW.

Figure 6:
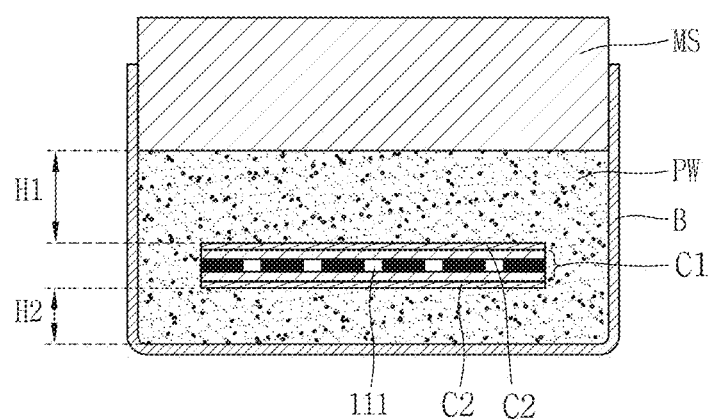
FIG. 6 is a view illustrating a state when a weight is placed on the mixture powder over the bonded first carbonized body and second carbonized body illustrated in FIG. 5.

As illustrated in FIG. 6, in order to reduce the time that the mixture powder PW takes to be infiltrated, a weight MS may be put on the bonded first carbonized body C1 and second carbonized body C2. The weight MS weighs 100 to 200 kg. The mixture powder PW is pressed to the bonded first carbonized body C1 and second carbonized body C2, so the mixture powder can be more quickly infiltrated into the bonded first carbonized body C1 and second carbonized body C2.

Hereinafter, the seventh step (S17) is described.

A container B illustrated in FIG. 5 is put into an electric resistance heating furnace (not illustrated).

The vacuum resistance heating furnace increases the temperature of the container B to 1550° C. for thirteen hours.

The mixture powder PW is melted and infiltrated into the bonded first carbonized body C1 and second carbonized body C2. The silicon powder Si_pw becomes silicon carbide by reacting with the carbon in the first carbonized body C1 and the carbon in the second carbonized body C2. The silicon powder Si_pw and the copper powder Cu_pw react with each other into a silicon-copper alloy $Si_xCu_y$. The silicon powder Si_pw and the copper powder Cu_pw that do not react remain as silicon and copper constituting the disc. As the mixture powder PW is infiltrated into the first carbonized body C1 and the second carbonized body C2, a carbon fiber-reinforced ceramic composites is produced.

Hereinafter, the eighth step (S18) is described.

The carbon fiber-reinforced ceramic composites is grinded by a grinder. A brake disc according to the first embodiment of the present invention is achieved through the first step S11 to the eighth step S18.

Figure 7:
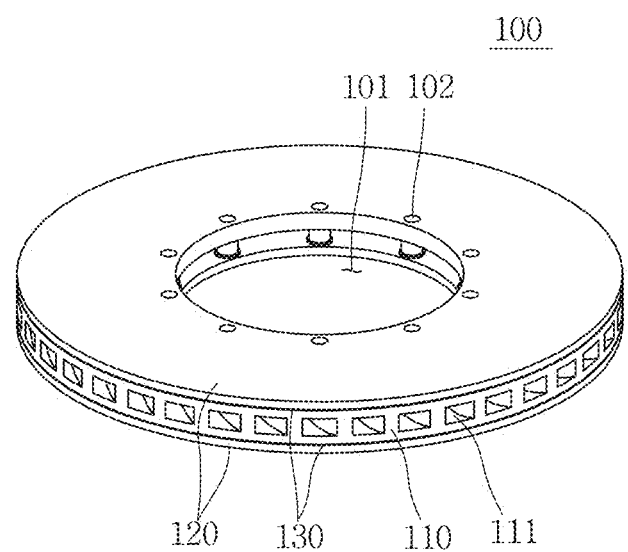
FIG. 7 is a view illustrating a brake disc manufactured by the method for manufacturing a brake disc according to the first embodiment of the present invention.

As illustrated in FIG. 7, a brake disc 100 manufactured by the method of manufacturing a brake disc according to the first embodiment of the present invention is composed of a support layer 110, a friction layer 120, and a bonding layer 130. In braking, the friction layer 120 comes in friction contact with the pad and the support layer 110 absorbs thermomechanical shock by supporting the friction layer 120.

A shaft hole 101 through which an axle passes is formed at the center of the brake disc 100. Through-holes 102 through which bolts are inserted to fasten a hat part are formed with regular intervals on the same circle around the shaft hole 101. Cooling channels 111 are formed in the support layer 110.

Hereinafter, a method for manufacturing a brake disc according to a second embodiment of the present invention will be described in detail.

Figure 8:
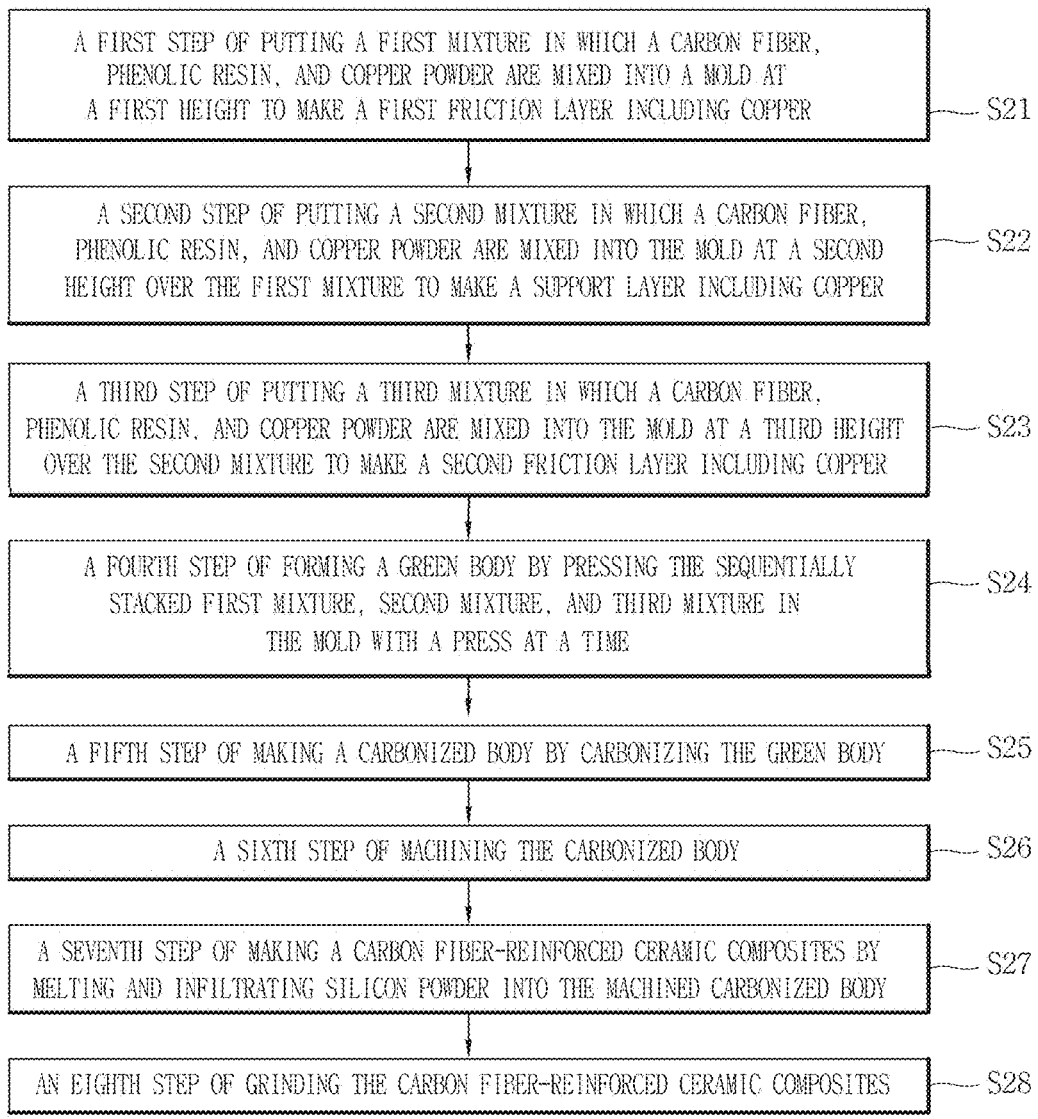
FIG. 8 is a flowchart illustrating a method for manufacturing a brake disc according to a second embodiment of the present invention.
Figure 9A:
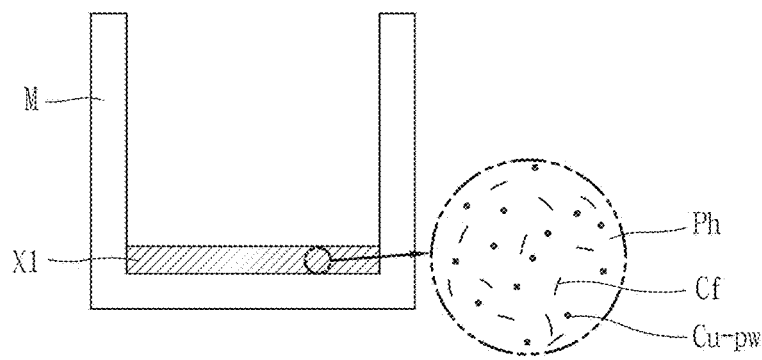
FIG. 9A is a view illustrating a state when a first mixture is in a mold.
Figure 9B:
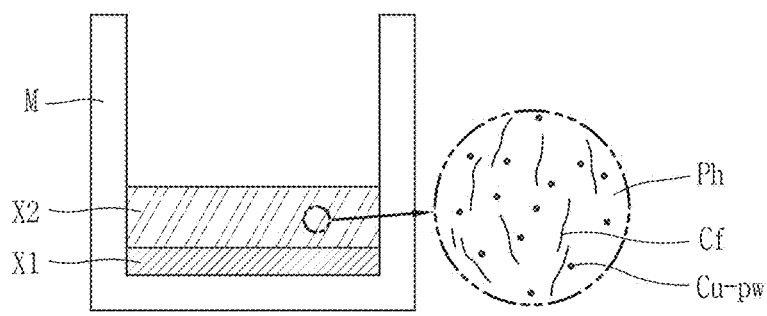
FIG. 9B is a view illustrating a state when a second mixture is in the mold such that the second mixture is placed over the first mixture.
Figure 9C:
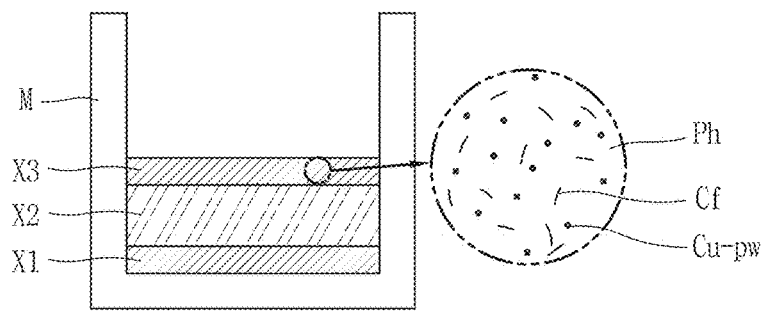
FIG. 9C is a view illustrating a state when a third mixture is in the mold such that the third mixture is placed over the second mixture.

As illustrated in FIG. 8, a method of manufacturing a brake disc according to a second embodiment of the present invention includes: a first step of putting a first mixture in which a carbon fiber, phenolic resin, and copper powder are mixed into a mold at a first height to make a first friction layer including copper (S21); a second step of putting a second mixture in which a carbon fiber, phenolic resin, and copper powder are mixed into the mold at a second height over the first mixture to make a support layer including copper (S22); a third step of putting a third mixture in which a carbon fiber, phenolic resin, and copper powder are mixed into the mold at a third height over the second mixture to make a second friction layer including copper (S23); a fourth step of forming a green body by pressing the sequentially stacked first mixture, second mixture, and third mixture in the mold with a press at a time (S24); a fifth step of making a carbonized body by carbonizing the green body (S25); a sixth step of machining the carbonized body (S26); a seventh step of making a carbon fiber-reinforced ceramic composites by melting and infiltrating silicon powder into the machined carbonized body (S27; and an eighth step of grinding the carbon fiber-reinforced ceramic composites (S28).

Hereinafter, the first step (S21) is described.

Referring to FIGS. 9A to 11, a first mixture X1 is made by mixing a carbon fiber Cf, phenolic resin Ph, and copper powder Cu_pw to make the first friction layer 120 including copper Cu. The length of the carbon fiber is 150 to 200 μm. The size of the copper powder Cu_pw is tens of micrometers.

The first mixture X1 is put into the mold M at the first height (1 to 2 mm).

In the first step (S21), it is possible to accurately adjust the amount of copper Cu to be included in the first friction layer 220 by quantitatively putting copper powder Cu_pw into the first mixture X1.

Hereinafter, the second step (S22) is described.

Referring to FIGS. 9B to 11, a second mixture X2 is made by mixing a carbon fiber Cf, phenolic resin Ph, and copper powder Cu_pw to make the support layer 210 including copper Cu. The length of the carbon fiber is less than 30 mm. In this embodiment, the length of the carbon fiber is 29 mm. Alternatively, carbon fibers having different lengths, that is, a carbon fiber of 29 mm and a carbon fiber of 6 mm may be mixed.

The second mixture X2 is put into the mold M at the second height (20 to 50 mm) over the first mixture X1.

In the second step (S22), it is possible to accurately adjust the amount of copper Cu to be included in the support layer 220 by quantitatively putting copper powder Cu_pw into the second mixture X2.

Hereinafter, the third step (S23) is described.

Referring to FIGS. 9C to 11, a third mixture X3 is made by mixing a carbon fiber Cf, phenolic resin Ph, and copper powder Cu_pw to make second friction 230 including copper Cu. The length of the carbon fiber is 150 to 200 μm.

The third mixture X3 is put into the mold M at the first height (1 to 2 mm).

In the third step (S23), it is possible to accurately adjust the amount of copper Cu to be included in the second friction layer 230 by quantitatively putting copper powder Cu_pw into the third mixture X3.

Hereinafter, the fourth step (S24) is described.

Figure 10A:
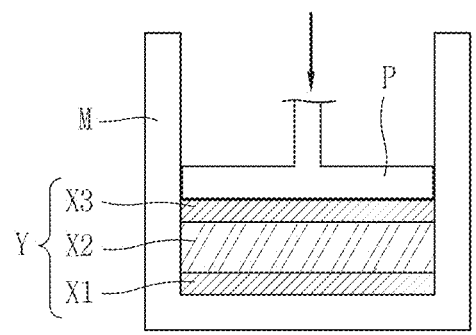
FIG. 10A is a view illustrating a state when a green body is made by pressing the first mixture, the second mixture, and the third mixture in the mold with a press.

As illustrated in FIG. 10A, a green body Y composed of the first mixture X1, the second mixture X2, and the third mixture X3 is formed by pressing the top of the third mixture X3 with a press P.

In this case, the pressing pressure is 3 to 5 MPa. It may be possible to dispose a heater on the press P and heat the first mixture X1, the second mixture X2, and the third mixture X3 with the heater. The heating temperature is 120 to 180° C.

Figure 10B:
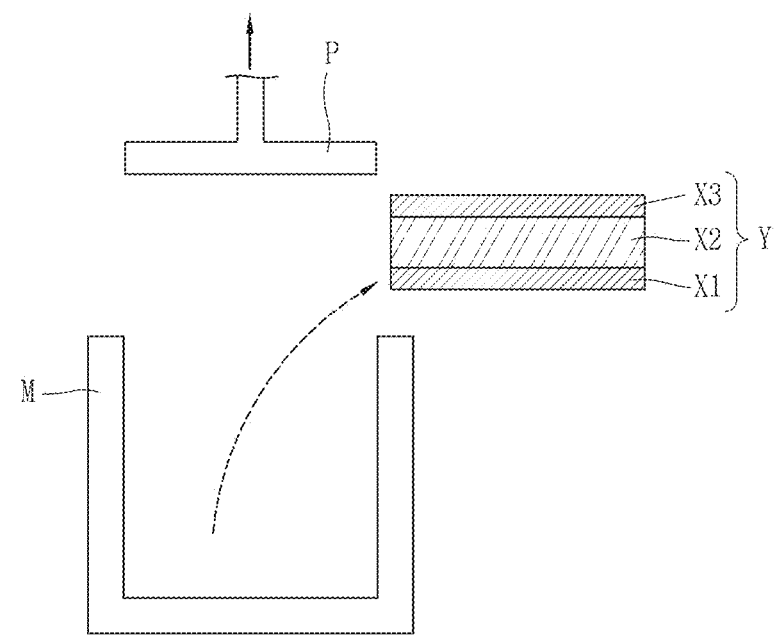
FIG. 10B is a view illustrating a state when a completed green body is taken out of the mold.

When the green body Y is completed, the green body Y is taken out of the mold M, as illustrated in FIG. 10B.

Hereinafter, the fifth step (S25) is described.

The green body Y is put into a container (not illustrated). The container is put into a vacuum resistance heating furnace (not illustrated). A vacuum atmosphere or an inert atmosphere was made in the vacuum resistance heating furnace.

The vacuum resistance heating furnace increases the temperature of the green body Y to 1000° C. for thirteen hours. The vacuum resistance heating furnace maintains the temperature of the green body Y at 1000° C. for one to two hours. While the temperature of the green body Y is increased and maintained at 1000° C., phenolic resin in the green body Y is thermally decomposed into carbon. Pores are formed at the portions left after the phenolic resin is thermally decomposed. As the green body Y is carbonized, a carbonized body is obtained.

Hereinafter, the sixth step (S26) is described.

Figure 11:
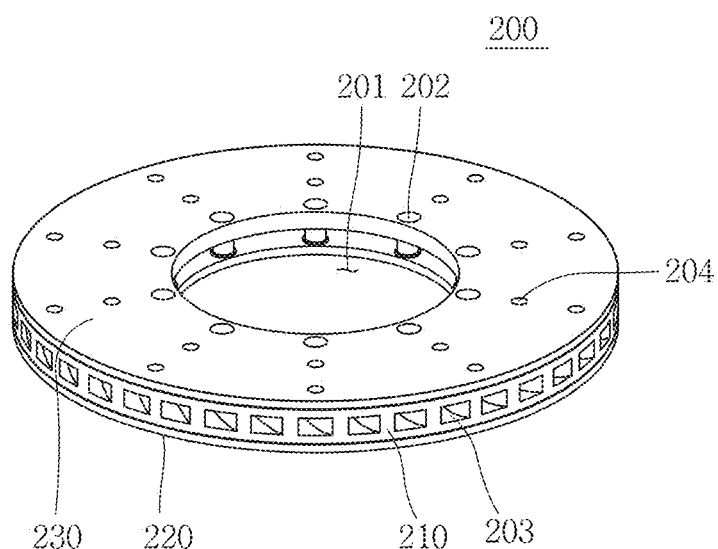
FIG. 11 is a view illustrating a brake disc manufactured by the method for manufacturing a brake disc according to the second embodiment of the present invention.

Referring to FIG. 11, a shaft hole 201 through which an axle passes is formed at the center of the carbonized body.

Through-holes 201 through which bolts are inserted to fasten a hat part are formed with regular intervals on the same circle around the shaft hole 202. The hat part is fastened to a wheel.

Cooling channels 203 are formed with regular intervals in a side of the carbonized body.

Perforations 204 are formed through the top and the bottom of the carbonized body to communicate with the cooling channels 203. The gaps between the perforations are 31 mm. As the result of a test, the optimum cooling performance was achieved, when the cooling channels 204 are formed with intervals of 31 mm.

Hereinafter, the seventh step (S27) is described.

A machined carbonized body is put into a container (not illustrated).

The grain size of the silicon powder is 1 to 2 mm.

The container is put into an electric resistance heating furnace (not illustrated).

The vacuum resistance heating furnace increases the temperature of the container to 1550° C. for thirteen hours.

As the silicon powder melts, it is infiltrated into the carbonized body. The silicon powder becomes a silicon carbide SiC by reacting with the carbon in the carbonized body. The silicon powder and the copper powder Cu_pw react with each other into a silicon-copper alloy $Si_xCu_y$. The silicon powder and the copper powder Cu_pw that do not react remain as silicon and copper constituting the disc. As the silicon powder is infiltrated into the carbonized body, a carbon fiber-reinforced ceramic composites is obtained.

Hereinafter, the eighth step (S28) is described.

The carbon fiber-reinforced ceramic composites is grinded by a grinder.

A brake disc according to the second embodiment of the present invention is achieved through the first step S21 to the eighth step S28.

Referring to FIG. 11, a brake disc 200 manufactured through the first step S21 to the eighth step S28 is composed of a support layer 210, a first friction layer 220, and a second friction layer 230. In braking, the first friction layer 220 and the second friction layer 230 come in friction contact with a pad and the support layer 210 absorbs thermomechanical shock.

A shaft hole 200 through which an axle passes is formed at the center of the brake disc 200. Through-holes 201 through which bolts are inserted to fasten a hat part are formed with regular intervals on the same circle around the shaft hole 202. Cooling channels 203 are formed in the side of the brake disc 200. Perforations 204 are formed through the top and the bottom of the brake disc 200 to communicate with the cooling channels 203.

The support layer 210 includes SiC 20 wt %, Si 7 wt %, C 53 wt %, and Cu 20 wt %. The support layer 210 is 25 to 50 mm thick.

The first friction layer 220 includes SiC 64 wt %, Si 6 wt %, C 10 wt %, Cu 20 wt %. The first friction layer 220 is 1 to 2 mm thick.

The second friction layer 230 includes SiC 64 wt %, Si 6 wt %, C 10 wt %, Cu 20 wt %. The second friction layer 230 is 1 to 2 mm thick.

Figure 12:
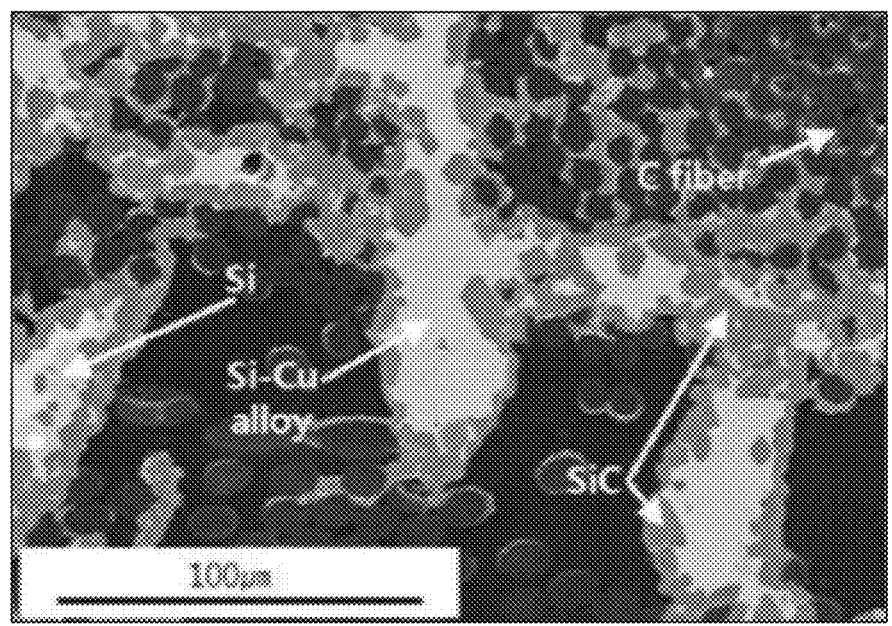
FIG. 12 is an enlarged picture of the inside of a disc made by the method of manufacturing a brake disc according to the first embodiment or the second embodiment of the present invention.

As illustrated in FIG. 12, the discs 100 and 200 manufactured by the methods of manufacturing a brake disc according to the first and second embodiments of the present invention includes a carbon fiber Cf, silicon Si, silicon carbide SiC, and a silicon-copper alloy $Si_xCu_y$. It also includes copper Cu and carbon C, which are not illustrated in the picture.

The carbon fiber Cf, silicon Si, carbon C, and silicon carbide SiC make a disc light and provide high thermal shock resistance, anti-oxidation, wear resistance, strength, and friction coefficient.

The copper Cu and silicon-copper alloy $Si_xCu_y$ increase heat capacity at constant volume of a disc, so a large increase in temperature of the disc is prevented and a changing range of the friction coefficient is reduced in braking.

This will be proved through the test results illustrated in FIGS. 13 to 16.

In the related art, brake discs are made of a carbon fiber-reinforced ceramic composites not including copper, but according to the method of manufacturing a brake disc of the present invention, a brake disc is made of carbon fiber-reinforced ceramic composites including copper. The circular dots indicate friction coefficients and the rectangular dots indicate temperatures of a disc.

Figure 13:
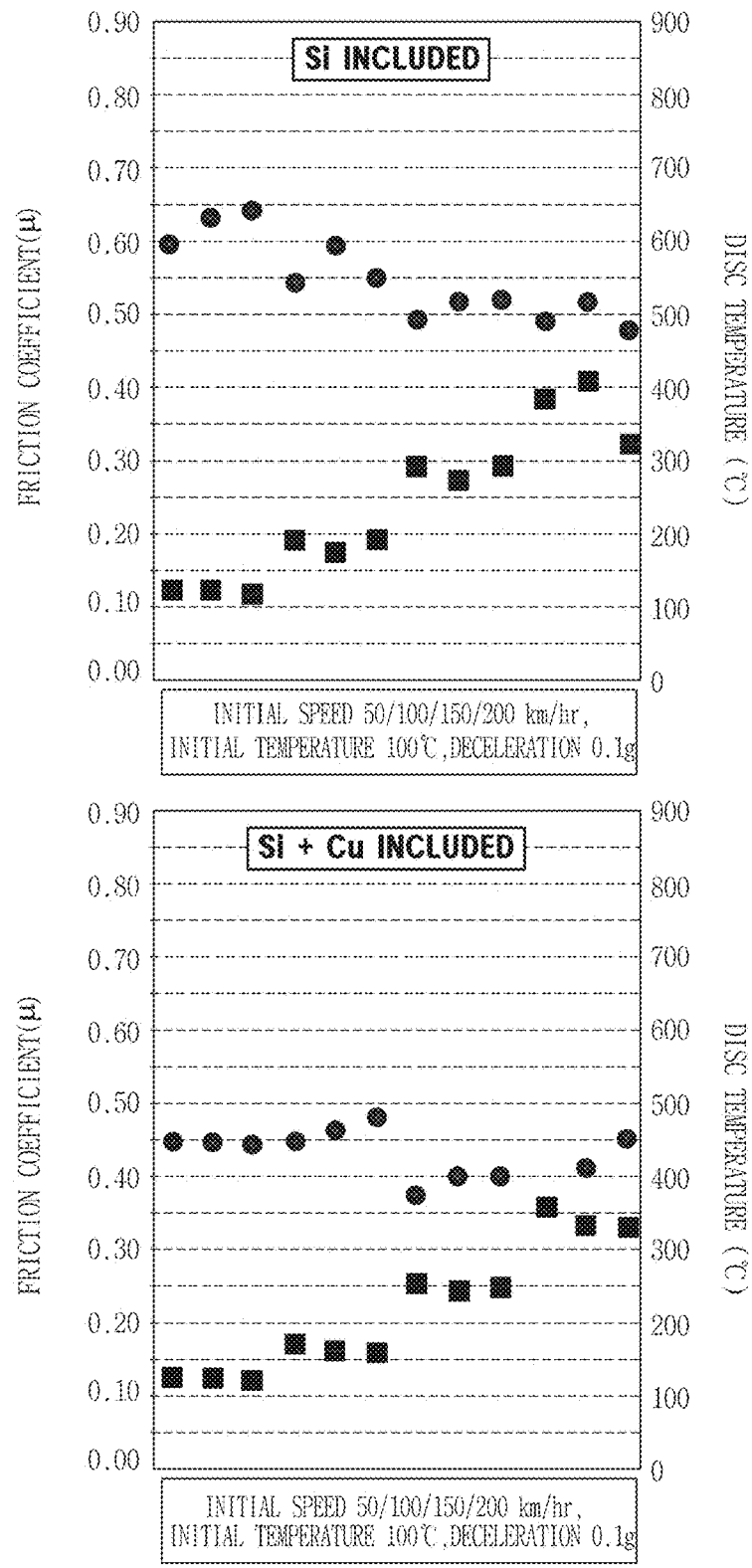
FIG. 13 provides graphs at upper and lower portions illustrating temperature and friction coefficients of a brake disc made of a carbon fiber-reinforced ceramic composites not including copper and a brake disc made of a carbon fiber-reinforced ceramic composites including copper, under first conditions (initial speed of a vehicle, initial temperature of a disc, and deceleration of a vehicle)

As illustrated in FIG. 13, tests was performed three times at each of initial speeds by changing the initial speeds to 50 km/hr, 100 km/hr, 150 km/hr, and 200 km/hr, with the initial temperature fixed at 100° C. and deceleration fixed at 0.1 g. In the upper and lower graphs, the first three circular dots and rectangular dots indicate friction coefficients and temperatures discs at the initial speed of 50 km/hr, the next three circular dots and rectangular dots indicate friction coefficients and temperatures of the discs at the initial speed of 100 km/hr, the next three circular dots and rectangular dots indicate friction coefficients and temperatures of the discs at the initial speed of 150 km/hr, and the last three circular dots and rectangular dots indicate friction coefficients and temperatures of the discs at the initial speed of 200 km/hr.

Comparing the upper and lower graphs illustrated in FIG. 13, it can be seen that the changing range of temperature (250° C.) of the brake disc according to the present invention is smaller than the changing range (300° C.) of temperature of the brake disc of the related art. That is, the brake disc according to the present invention less increases in temperature than the brake disc of the related art in braking.

Further, it can be seen that the changing range (0.1) of the friction coefficient of the brake disc according to the present invention is smaller than the changing range (0.175) of the friction coefficient of the brake disc of the related art.

Figure 14:
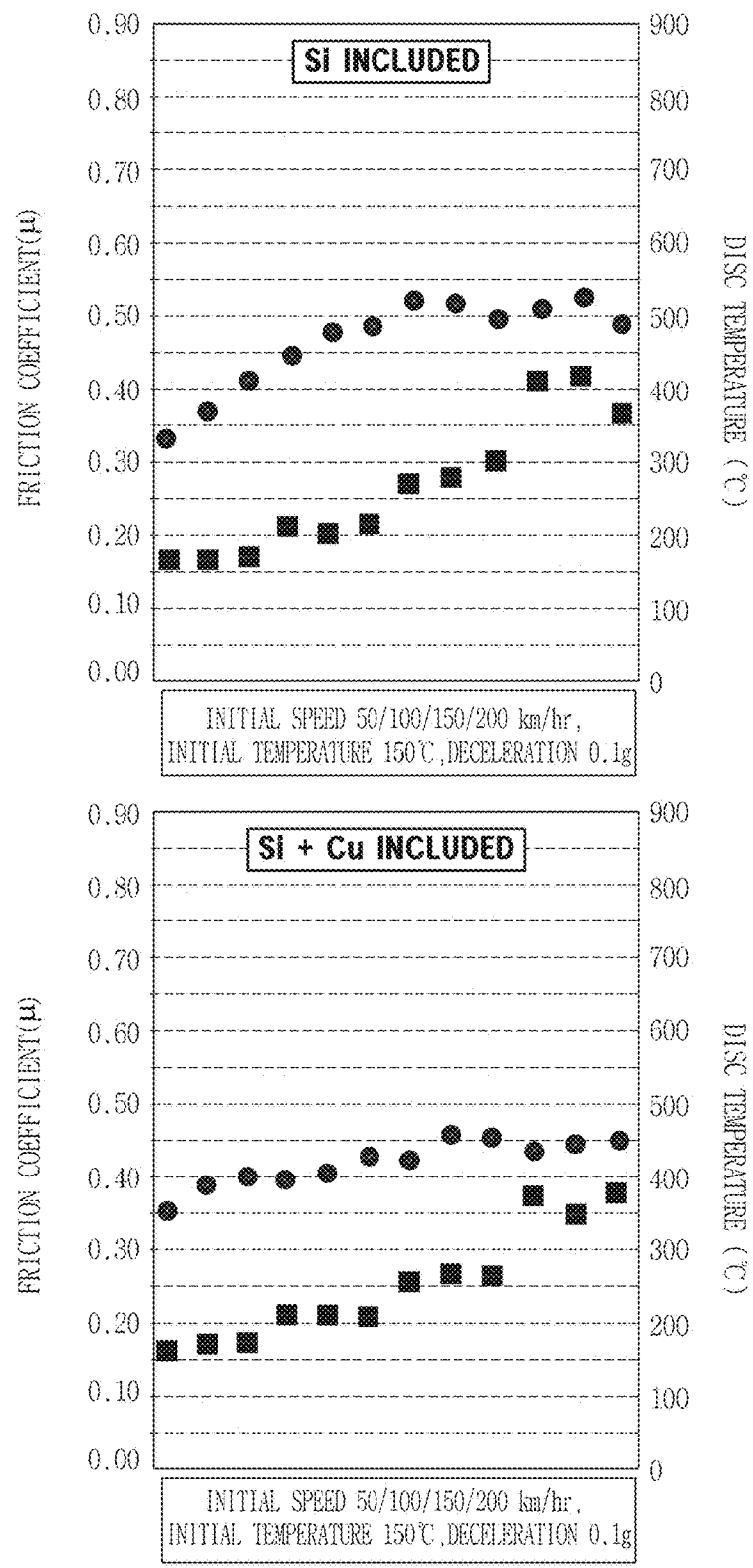
FIG. 14 provides graphs at upper and lower portions illustrating temperature and friction coefficients of a brake disc made of a carbon fiber-reinforced ceramic composites not including copper and a brake disc made of a carbon fiber-reinforced ceramic composites including copper, under second conditions (initial speed of a vehicle, initial temperature of a disc, and deceleration of a vehicle)

As illustrated in FIG. 14, tests was performed three times at each of initial speeds by changing the initial speeds to 50 km/hr, 100 km/hr, 150 km/hr, and 200 km/hr, with the initial temperature fixed at 150° C. and deceleration fixed at 0.1 g. In the upper and lower graphs, the first three circular dots and rectangular dots indicate friction coefficients and temperatures discs at the initial speed of 50 km/hr, the next three circular dots and rectangular dots indicate friction coefficients and temperatures of the discs at the initial speed of 100 km/hr, the next three circular dots and rectangular dots indicate friction coefficients and temperatures of the discs at the initial speed of 150 km/hr, and the last three circular dots and rectangular dots indicate friction coefficients and temperatures of the discs at the initial speed of 200 km/hr.

Comparing the upper and lower graphs illustrated in FIG. 14, it can be seen that the changing range of temperature (225° C.) of the brake disc according to the present invention is smaller than the changing range (250° C.) of temperature of the brake disc of the related art. That is, the brake disc according to the present invention less increases in temperature than the brake disc of the related art in braking.

Further, it can be seen that the changing range (0.1) of the friction coefficient of the brake disc according to the present invention is smaller than the changing range (0.2) of the friction coefficient of the brake disc of the related art.

Figure 15:
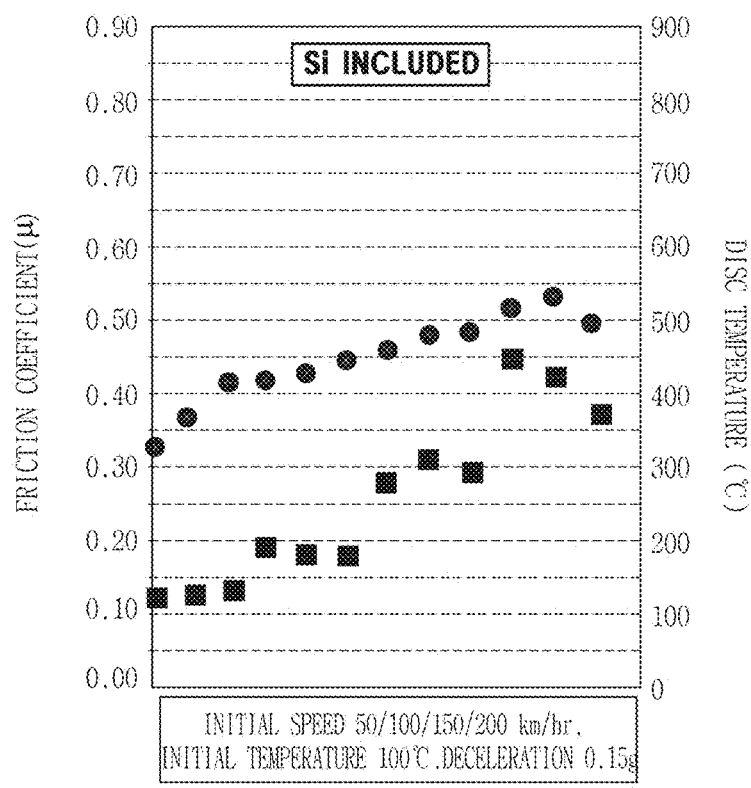
FIG. 15 provides graphs at upper and lower portions illustrating temperature and friction coefficients of a brake disc made of a carbon fiber-reinforced ceramic composites not including copper and a brake disc made of a carbon fiber-reinforced ceramic composites including copper, under third conditions (initial speed of a vehicle, initial temperature of a disc, and deceleration of a vehicle)
Figure 15:
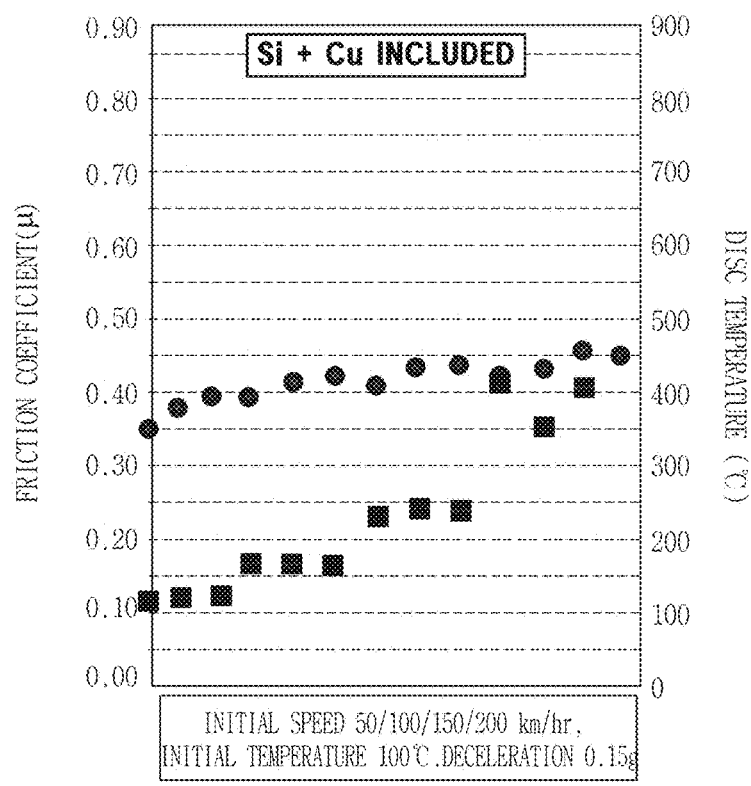

As illustrated in FIG. 15, tests was performed three times at each of initial speeds by changing the initial speeds to 50 km/hr, 100 km/hr, 150 km/hr, and 200 km/hr, with the initial temperature fixed at 100° C. and deceleration fixed at 0.15 g. In the upper and lower graphs, the first three circular dots and rectangular dots indicate friction coefficients and temperatures discs at the initial speed of 50 km/hr, the next three circular dots and rectangular dots indicate friction coefficients and temperatures of the discs at the initial speed of 100 km/hr, the next three circular dots and rectangular dots indicate friction coefficients and temperatures of the discs at the initial speed of 150 km/hr, and the last three circular dots and rectangular dots indicate friction coefficients and temperatures of the discs at the initial speed of 200 km/hr.

Comparing the upper and lower graphs illustrated in FIG. 15, it can be seen that the changing range of temperature (300° C.) of the brake disc according to the present invention is smaller than the changing range (350° C.) of temperature of the brake disc of the related art. That is, the brake disc according to the present invention less increases in temperature than the brake disc of the related art in braking.

Further, it can be seen that the changing range (0.1) of the friction coefficient of the brake disc according to the present invention is smaller than the changing range (0.2) of the friction coefficient of the brake disc of the related art.

Figure 16:
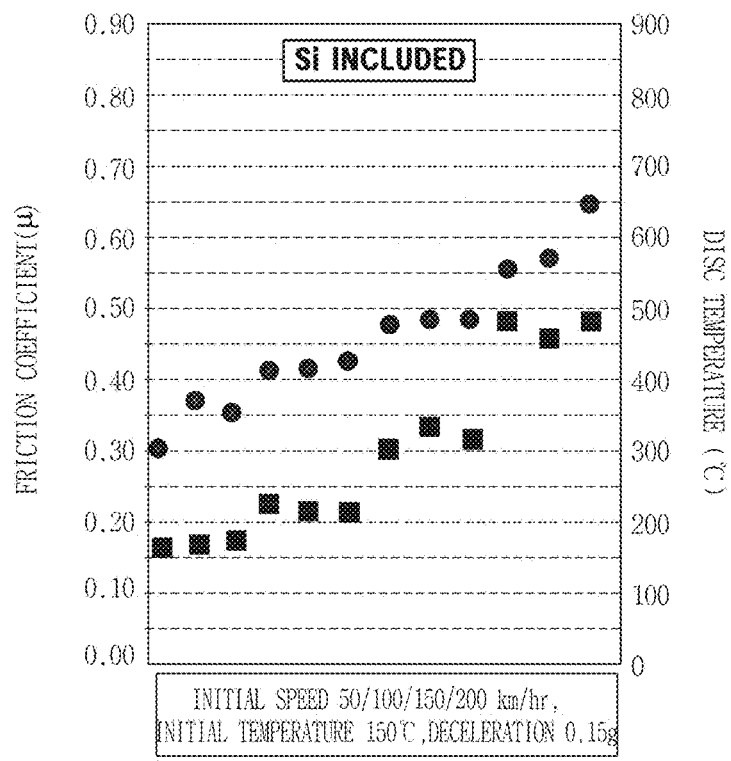
FIG. 16 provides graphs at upper and lower portions illustrating temperature and friction coefficients of a brake disc made of a carbon fiber-reinforced ceramic composites not including copper and a brake disc made of a carbon fiber-reinforced ceramic composites including copper, under fourth conditions (initial speed of a vehicle, initial temperature of a disc, and deceleration of a vehicle).
Figure 16:
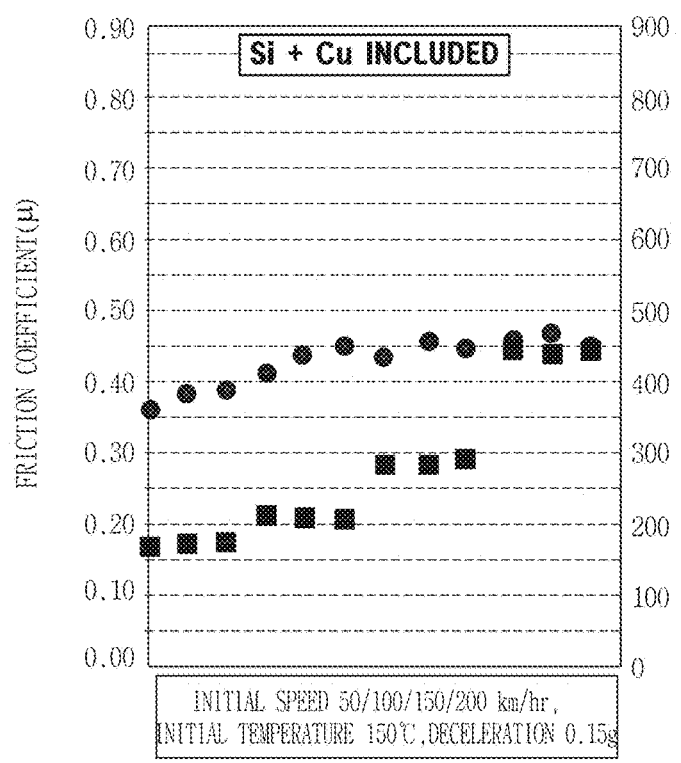

As illustrated in FIG. 16, tests was performed three times at each of initial speeds by changing the initial speeds to 50 km/hr, 100 km/hr, 150 km/hr, and 200 km/hr, with the initial temperature fixed at 150° C. and deceleration fixed at 0.15 g. In the upper and lower graphs, the first three circular dots and rectangular dots indicate friction coefficients and temperatures discs at the initial speed of 50 km/hr, the next three circular dots and rectangular dots indicate friction coefficients and temperatures of the discs at the initial speed of 100 km/hr, the next three circular dots and rectangular dots indicate friction coefficients and temperatures of the discs at the initial speed of 150 km/hr, and the last three circular dots and rectangular dots indicate friction coefficients and temperatures of the discs at the initial speed of 200 km/hr.

Comparing the upper and lower graphs illustrated in FIG. 16, it can be seen that the changing range of temperature (300° C.) of the brake disc according to the present invention is smaller than the changing range (350° C.) of temperature of the brake disc of the related art. That is, the brake disc according to the present invention less increases in temperature than the brake disc of the related art in braking.

Further, it can be seen that the changing range (0.1) of the friction coefficient of the brake disc according to the present invention is smaller than the changing range (0.35) of the friction coefficient of the brake disc of the related art.

It can be seen from the results of tests that the method of manufacturing a brake disc of the present invention can completely solve the problems that the method of manufacturing a brake disc of the related cannot solve.

That is, the brake disc according to the present invention has all of the advantage of a brake disc made of a carbon fiber-reinforced ceramic composites without thermal deformation and deterioration of a pad, a hat part, and a caliper due to high-temperature friction heat.

Meanwhile, when a brake disc is manufactured by the method of manufacturing a brake disc according to the second embodiment of the present invention, it is possible to make and bond formed bodies forming a first friction layer, a support layer, and a second friction layer at a time. Accordingly, as compared with separately manufacturing and bonding formed bodies forming a first friction layer, a support layer, and a second friction layer, it is possible to reduce the time taken to formed bodies, so it is possible to reduce the time taken to manufacture a brake disc having the effect described above.

Further, when a brake disc is manufactured by the method of manufacturing a brake disc according to the second embodiment of the present invention, a fixed amount of copper powder is included in a first mixture, a second mixture, and a third mixture, so it is possible to accurately adjust the amount of copper to be included in the first friction layer, the support layer, and the second friction layer.

While the present invention has been illustrated and described in connection with the exemplary embodiments, it will be apparent to those skilled in the art that modifications and variations can be made without departing from the spirit and scope of the invention as defined by the appended claims.

What is claimed is:

1. A method of manufacturing a vehicle brake disc, comprising:
   a first step of making a first mixture by mixing a carbon fiber and phenolic resin and making a second mixture by mixing another carbon fiber and phenolic resin;
   a second step of making a first green body by pressing the first mixture in a mold with a press and making a second green body by pressing the second mixture in the mold with a press;
   a third step of making a first carbonized body by carbonizing the first green body and making a second carbonized body by carbonizing the second green body;
   a fourth step of machining the first carbonized body and the second carbonized body;
   a fifth step of bonding the machined first carbonized body and second carbonized body to each other;
   a sixth step of putting mixture powder made by mixing only silicon powder and copper powder at a ratio of silicon powder 6 to copper powder 4 wt % over and under the bonded machined first and second carbonized bodies;
   a seventh step of making carbon fiber-reinforced ceramic composites by melting and infiltrating the mixture powder into the bonded machined first and second carbonized bodies; and
   an eighth step of grinding the carbon fiber-reinforced ceramic composites,
   wherein the ratio of silicon powder 6 to copper powder 4 wt % of the silicon powder and the copper powder is to increase density of the vehicle brake disc by copper of the copper powder and simultaneously to impregnate the copper powder into the bonded machined first and second carbonized bodies well when processing the seventh step.

2. A method of manufacturing a brake disc, comprising:
   a first step of making a first mixture by mixing a carbon fiber and phenolic resin and making a second mixture by mixing another carbon fiber and phenolic resin;
   a second step of making a first green body by pressing the first mixture in a mold with a press and making a second green body by pressing the second mixture in the mold with a press;
   a third step of making a first carbonized body by carbonizing the first green body and making a second carbonized body by carbonizing the second green body;
   a fourth step of machining the first carbonized body and the second carbonized body;
   a fifth step of bonding the machined first carbonized body and second carbonized body to each other;
   a sixth step of putting mixture powder made by mixing only silicon powder and copper powder at a ratio of silicon powder 6 to copper powder 4 wt % over and under the bonded machined first and second carbonized bodies and putting a weight on the mixture powder over the bonded machined first and second carbonized bodies;
   a seventh step of making carbon fiber-reinforced ceramic composites by melting and infiltrating the mixture powder into the bonded machined first and second carbonized bodies; and
   an eighth step of grinding the carbon fiber-reinforced ceramic composites,
   wherein the sixth step of putting mixture powder made by mixing only silicon powder and copper powder at a ratio of silicon powder 6 to copper powder 4 wt % is to increase density of the vehicle brake disc by copper Cu and simultaneously to impregnate the copper powder into the bonded first and second carbonized bodies well when processing the seventh step.

* * * * *